(12) United States Patent
Honkala et al.

(10) Patent No.: US 10,891,524 B2
(45) Date of Patent: Jan. 12, 2021

(54) METHOD AND AN APPARATUS FOR EVALUATING GENERATIVE MACHINE LEARNING MODEL

(71) Applicant: Nokia Technologies Oy, Espoo (FI)

(72) Inventors: Mikko Honkala, Espoo (FI); Francesco Cricri, Tampere (FI); Xingyang Ni, Tampere (FI)

(73) Assignee: Nokia Technologies Oy, Espoo (FI)

( * ) Notice: Subject to any disclaimer, the term of this patent is extended or adjusted under 35 U.S.C. 154(b) by 208 days.

(21) Appl. No.: 16/017,742

(22) Filed: Jun. 25, 2018

(65) Prior Publication Data

US 2019/0012581 A1    Jan. 10, 2019

(30) Foreign Application Priority Data

Jul. 6, 2017 (GB) ..................................... 1710877

(51) Int. Cl.
*G06K 9/62* (2006.01)
*G06K 9/72* (2006.01)
*G06N 3/08* (2006.01)
*G06N 3/04* (2006.01)

(52) U.S. Cl.
CPC ......... *G06K 9/6265* (2013.01); *G06K 9/6212* (2013.01); *G06K 9/726* (2013.01); *G06N 3/04* (2013.01); *G06N 3/0445* (2013.01); *G06N 3/0454* (2013.01); *G06N 3/0472* (2013.01); *G06N 3/0481* (2013.01); *G06N 3/088* (2013.01)

(58) Field of Classification Search
CPC .................................................. G06K 9/6265
See application file for complete search history.

(56) References Cited

U.S. PATENT DOCUMENTS

| 9,213,946 | B1 | 12/2015 | Chavira et al. |
| 2013/0346351 | A1 | 12/2013 | Lin et al. |
| 2015/0093737 | A1 | 4/2015 | Yun et al. |
| 2016/0358099 | A1 | 12/2016 | Sturlaugson et al. |

(Continued)

FOREIGN PATENT DOCUMENTS

| CN | 107016406 A | 8/2017 |
| GB | 2545661 A | 6/2017 |

OTHER PUBLICATIONS

Salimans et al., "Improved Techniques for Training GANs" (Year: 2016).*

(Continued)

*Primary Examiner* — Ross Varndell
(74) *Attorney, Agent, or Firm* — Harrington & Smith

(57) ABSTRACT

The invention relates to a method comprising receiving a set of input samples, said set of input images comprising real images and generated images; extracting a set of feature maps from multiple layers of a pre-trained neural network for both the real images and the generated images; determining statistics for each feature map of the set of feature maps; comparing statistics of the feature maps for the real images to statistics of the feature maps for the generated images by using a distance function to obtain a vector of distances; and averaging the distances of the vector of distances to have a value indicating a diversity of the generated images. The invention also relates to technical equipment for implementing the method.

19 Claims, 8 Drawing Sheets

(56) References Cited

U.S. PATENT DOCUMENTS

2018/0144466 A1* 5/2018 Hsieh .................. G06F 19/00

OTHER PUBLICATIONS

Salimans et al., "Improved Techniques for Training GANs", Proceedings of the 30th International Conference on Neural Information Processing Systems, 2016, pp. 1-10.

Wu et al., "On the Quantitative Analysis of Decoder-Based Generative Models", arXiv, 2017, pp. 1-17.

Theis et al., "A Note on the Evaluation of Generative Models", International Conference on Learning Representations (ICLR), 2016, pp. 1-10.

Ba et al., "Layer Normalization", arXiv, Jul. 21, 2016, pp. 1-14.

Rasmus et al., "Semi-Supervised Learning with Ladder Networks", 15 Proceedings of the 28th International Conference on Neural Information Processing Systems, vol. 2, 2015, pp. 1-19.

Im et al., "Generative Adverarial Metric", ICLR Workshop, 2016, pp. 1-3.

Grover et al., "Flow-GAN: Bridging Implicit and Prescribed Learning in Generative Models", arXiv, May 24, 2017, pp. 1-12.

Hendrycks et al., "A Quantitative Measure of Generative Adversarial Network Distributions", ICLR Workshop, 2017, pp. 1-7.

Caruana et al., "An Empirical Comparison of Supervised Learning Algorithms", Proceedings of the 23rd international conference on Machine learning, Jun. 25-29, 2006, 8 pages.

Heusel et al., "GANs Trained by a Two Time-Scale Update Rule Converge to a Local Nash Equilibrium", 31st Conference on Neural Information Processing Systems (NIPS), 2017, pp. 1-12.

Search Report received for corresponding United Kingdom Patent Application No. 1710877.0, dated Dec. 14, 2017, 4 pages.

\* cited by examiner

METHOD AND AN APPARATUS FOR EVALUATING GENERATIVE MACHINE LEARNING MODEL

TECHNICAL FIELD

The present solution generally relates to machine learning. In particular, the present solution relates to a method and technical equipment for evaluating generative machine learning model.

BACKGROUND

Many practical applications rely on the availability of semantic information about the content of the media, such as images, videos, etc. Semantic information is represented by metadata which may express the type of scene, the occurrence of a specific action/activity, the presence of a specific object, etc. Such semantic information can be obtained by analyzing the media.

The analysis of media is a fundamental problem which has not yet been completely solved. This is especially true when considering the extraction of high-level semantics, such as object detection and recognition, scene classification (e.g., sport type classification) action/activity recognition, etc.

The development of various neural network techniques has enabled learning to recognize image content directly from the raw image data, whereas previous techniques consisted of learning to recognize image content by comparing the content against manually trained image features.

A specific type of machine learning models, referred to as generative machine learning models, are trained to generate new data, for example images. One example of a family of generative models is Generative Adversarial Networks (GANs).

SUMMARY

When a machine learning system is developed, one task is to compare a model to other models. Now there has been invented an improved method and technical equipment implementing the method, by which generative machine learning models can be automatically evaluated. Various aspects of the invention include a method, an apparatus and a computer readable medium comprising a computer program stored therein, which are characterized by what is stated in the independent claims. Various embodiments of the invention are disclosed in the dependent claims.

According to a first aspect, there is provided a method, comprising receiving a set of input samples, said set of input images comprising real images and generated images; extracting a set of feature maps from multiple layers of a pre-trained neural network for both the real images and the generated images; determining statistics for each feature map of the set of feature maps; comparing statistics of the feature maps for the real images to statistics of the feature maps for the generated images by using a distance function to obtain a vector of distances; and averaging the distances of the vector of distances to have a value providing information about the level of diversity of the generated images.

According to a second aspect, there is provided an apparatus comprising at least one processor, memory including computer program code, the memory and the computer program code configured to, with the at least one processor, cause the apparatus to perform at least the following receive a set of input samples, said set of input images comprising real images and generated images; extract a set of feature maps from multiple layers of a pre-trained neural network for both the real images and the generated images; determine statistics for each feature map of the set of feature maps; compare statistics of the feature maps for real images to statistics of the feature maps for the generated images by using a distance function to obtain a vector of distances; and average the distances of the vector of distances to have a value providing information about the level of diversity of the generated images.

According to a third aspect, there is provided a computer program product embodied on a non-transitory computer readable medium, comprising computer program code configured to, when executed on at least one processor, cause an apparatus or a system to receive a set of input samples, said set of input images comprising real images and generated images; extract a set of feature maps from multiple layers of a pre-trained neural network for both the real images and the generated images; determine statistics for each feature map of the set of feature maps; compare statistics of the feature maps for real images to statistics of the feature maps for the generated images by using a distance function to obtain a vector of distances; average the distances of the vector of distances to have a value providing information about the level of diversity of the generated images.

According to a fourth aspect, there is provided a computer program product embodied on a non-transitory computer readable medium, comprising computer program code configured to, when executed on at least one processor, cause an apparatus or a system to perform a method as specified above and in embodiments below.

According to a fifth aspect, there is provided an apparatus comprising at least means for receiving a set of input samples, said set of input images comprising real images and generated images; means for extracting a set of feature maps from multiple layers of a pre-trained neural network for both the real images and the generated images; means for determining statistics for each feature map of the set of feature maps; means for comparing statistics of the feature maps for real images to statistics of the feature maps for the generated images by using a distance function to obtain a vector of distances; and means for averaging the distances of the vector of distances to have a value providing information about the level of diversity of the generated images.

According to an embodiment, the pre-trained neural network is an autoencoder or a ladder autoencoder trained via unsupervised or semi-supervised training.

According to an embodiment, the statistics are computed per spatial or temporal location in addition to computing them per feature map.

According to an embodiment, statistics comprises one or more of the following: a feature map mean, a variance, covariance and/or cross-correlation between feature maps and/or spatial and temporal locations.

According to an embodiment, the step of averaging the distances of the vector of distances produce a final distance, an inverse of which is the value for indicating a diversity of the generated images.

According to an embodiment, a value indicating semantic stability of the generated images is determined by inputting a random vector to the pre-trained neural network and varying the input random vector to determine a change in a semantic space.

DESCRIPTION OF THE DRAWINGS

In the following, various embodiments of the invention will be described in more detail with reference to the appended drawings, in which.

DESCRIPTION OF EXAMPLE EMBODIMENTS

The present embodiments are discussed with reference to generative machine learning models. Examples of apparatus, methods, and their related results according to embodiments are given below. Unless otherwise defined, all technical and scientific terms used herein have the same meaning as commonly understood by a skilled person. In case of conflict, the present description, including definitions will control.

In the following description, "one embodiment" or "an embodiment" means that a particular feature, structure, or characteristic described in connection with the embodiment is included in at least one embodiment of the disclosure. The phrases "in one embodiment" in various places in the description are not necessarily all referring to the same embodiment, nor are separate or alternative embodiments mutually exclusive of other embodiments. Moreover, various features are described which may be exhibited by some embodiments and not by others.

Figure 1:
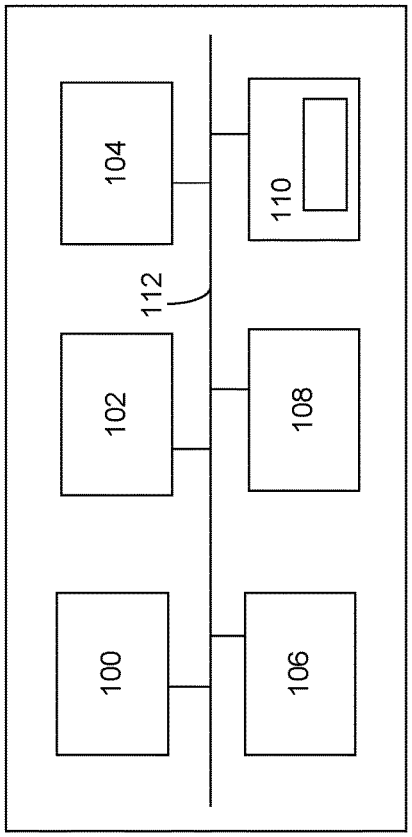
FIG. 1 shows a computer system suitable to be used in a computer vision process according to an embodiment.

FIG. 1 shows a computer system suitable to be used in image processing, for example in computer vision process according to an embodiment. The generalized structure of the computer system will be explained in accordance with the functional blocks of the system. Several functionalities can be carried out with a single physical device, e.g. all calculation procedures can be performed in a single processor if desired. A data processing system of an apparatus according to an example of FIG. 1 comprises a main processing unit 100, a memory 102, a storage device 104, an input device 106, an output device 108, and a graphics subsystem 110, which are all connected to each other via a data bus 112. The main processing unit 100 is a processing unit comprising processor circuitry and arranged to process data within the data processing system. The memory 102, the storage device 104, the input device 106, and the output device 108 may include conventional components as recognized by those skilled in the art. The memory 102 and storage device 104 store data within the data processing system 100. Computer program code resides in the memory 102 for implementing, for example, computer vision process. The input device 106 inputs data into the system while the output device 108 receives data from the data processing system and forwards the data, for example to a display, a data transmitter, or other output device. The data bus 112 is a conventional data bus and while shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

As used herein, a "processor," includes a general purpose, dedicated or shared processor and, typically, firmware or software modules that are executed by the processor. Depending upon implementation-specific or other considerations, the processor can be centralized or its functionality distributed. The processor can include general or special purpose hardware, firmware, or software embodied in a computer-readable (storage) medium for execution by the processor. As used herein, a computer readable medium or computer-readable storage medium is intended to include all mediums that are statutory, and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, etc.), but may or may not be limited to hardware.

It needs to be understood that different embodiments allow different parts to be carried out in different elements. For example, various processes of the computer vision system may be carried out in one or more processing devices; for example, entirely in one computer device, or in one server device or across multiple user devices. The elements of computer vision process may be implemented as a software component residing on one device or distributed across several devices, as mentioned above, for example so that the devices form a so-called cloud.

One approach for the analysis of data in general and of visual data in particular is deep learning. Deep learning is a sub-field of machine learning. Deep learning may involve learning of multiple layers of nonlinear processing units, either in supervised or in unsupervised manner. These layers form a hierarchy of layers, which may be referred to as artificial neural network.

Each learned layer extracts feature representations from the input data, where features from lower layers represent low-level semantics (i.e. more abstract concepts). Unsupervised learning applications may include pattern analysis (e.g. clustering, feature extraction) whereas supervised learning applications may include classification of image objects.

Deep learning techniques allow for recognizing and detecting objects in images or videos with great accuracy, outperforming previous methods. One difference of deep learning image recognition techniques compared to previous methods is learning to recognize image objects directly from the raw data, whereas previous techniques are based on recognizing the image objects from hand-engineered features (e.g. SIFT features). During the training stage, deep learning techniques build hierarchical layers which extract features of increasingly abstract level. Thus, an extractor or a feature extractor may be used in deep learning techniques. An example of a feature extractor in deep learning techniques is a Convolutional Neural Network (CNN), shown in FIG. 2a. A CNN may be composed of one or more convolutional layers with fully connected layers on top. CNNs are easier to train than other deep neural networks and have fewer parameters to be estimated. Therefore, CNNs have turned out to be a highly attractive architecture to use, especially in image and speech applications.

Figure 2A:
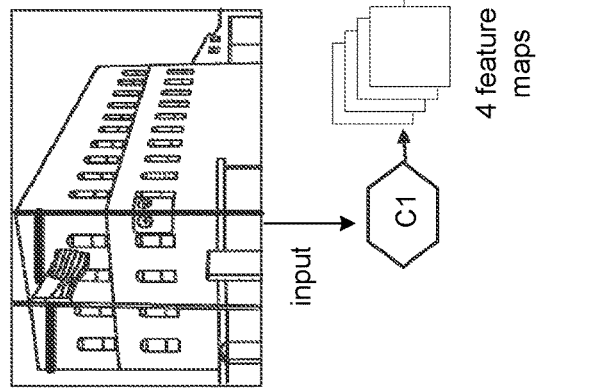
FIG. 2a shows an example of a Convolutional Neural Network that may be used in computer vision systems.

In FIG. 2a, the input to a CNN is an image, but any other media content object, such as video or audio file, could be used as well. Each layer of a CNN represents a certain abstraction (or semantic) level, and the CNN extracts multiple feature maps. The CNN in FIG. 2a has only three feature (or abstraction, or semantic) layers C1, C2, C3 for the sake of simplicity, but top-performing CNNs may have over 1000 feature layers.

The first convolution layer C1 of the CNN consists of extracting 4 feature-maps from the first layer (i.e. from the input image) These maps may represent low-level features found in the input image, such as edges and corners. The second convolution layer C2 of the CNN, consisting of extracting 6 feature-maps from the previous layer, increases the semantic level of extracted features. Similarly, the third convolution layer C3 may represent more abstract concepts found in images, such as combinations of edges and corners, shapes, etc. The last layer of the CNN (fully connected MLP) does not extract feature-maps. Instead, it may use the feature-maps from the last feature layer in order to predict (recognize) the object class. For example, it may predict that the object in the image is a house.

It is appreciated that the goal of the neural network is to transform input data into a more useful output. One of the examples is classification, where input data is classified into one of N possible classes (e.g., classifying if an image contains a cat or a dog). Another example is regression, where input data is transformed into a Real number (e.g. determining the music beat of a song).

Yet, another example is generating an image from a noise distribution. The power of neural networks comes from the internal representation which is built inside the layers. This representation is distributed among many units and is hierarchical, where complex concepts build on top of simpler concepts.

A neural network has two main modes of operation: learning (a.k.a. training)

phase and testing phase. The learning phase is the development phase, where the network learns to perform the final task. Learning may involve iteratively updating the weights or connections between units. The testing phase is the phase in which the network actually performs the task. Learning can be performed in several ways, for example, as a supervised learning, as an unsupervised learning, or as a reinforcement learning. In supervised learning, the network is provided with input-output pairs, where the output is usually a label. In supervised learning, the network is provided only with input data (and also with output raw data in case of self-supervised training). In reinforcement training, the supervision is more sparse and less precise; instead of input-output pairs, the network gets input data and, sometimes, delayed rewards in the form of scores (e.g., −1, 0, or +1).

Figure 2B:
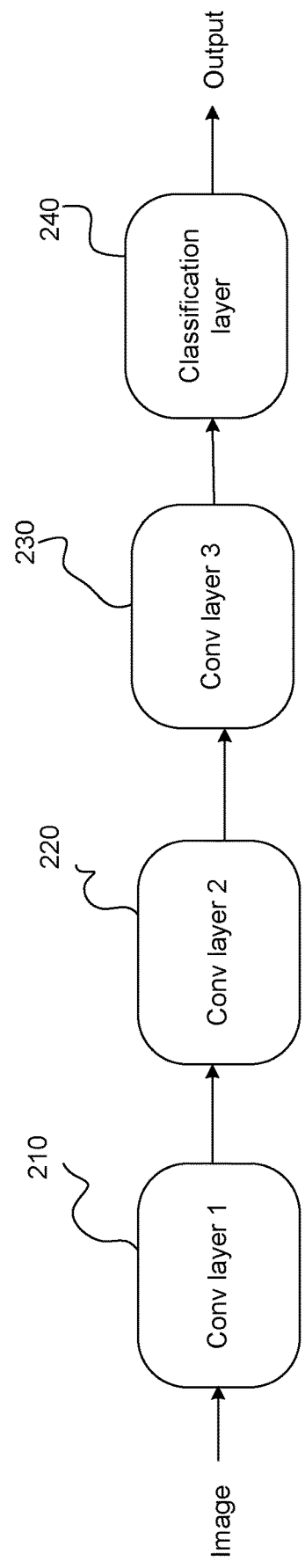
FIG. 2b shows a high-level example of a Convolutional Neural Network.

FIG. 2b illustrates another high-level example of a Convolutional Neural Network. The Convolutional Neural Network receives an image as an input, and the convolutional layers 210, 220, 230 perform convolution operations on the image with weights shared spatially. Lower layers 210, 220 extract semantically low-level features, such as edges and textures, from the image Higher-level layers 230 extract semantically high-level features, such as shapes, objects, scene (e.g., chair, person, room), from the image. The classification layer 240 classifies the input image into one or more class according the extracted content, which class(es) is/are output from the Convolutional Neural Network.

A neural encoder-decoder model is a neural network made of two parts, i.e. an encoder and a decoder. Encoder is a neural network which takes in an input image and extracts feature maps at multiple layers, and outputs the feature maps from the last convolutional layer. Decoder is a neural network which takes in feature maps from the last convolutional layer of the encoder and reconstructs the image with multiple layers of computation. This kind of model is able to encode data into a lower-dimensional vector (the feature maps) and reconstructs the data from that vector. The neural encoder-decoder model can be utilized in applications, such as denoising an input image, inpainting missing data, pre-training an encoder for feature extraction, etc.

Figure 3:
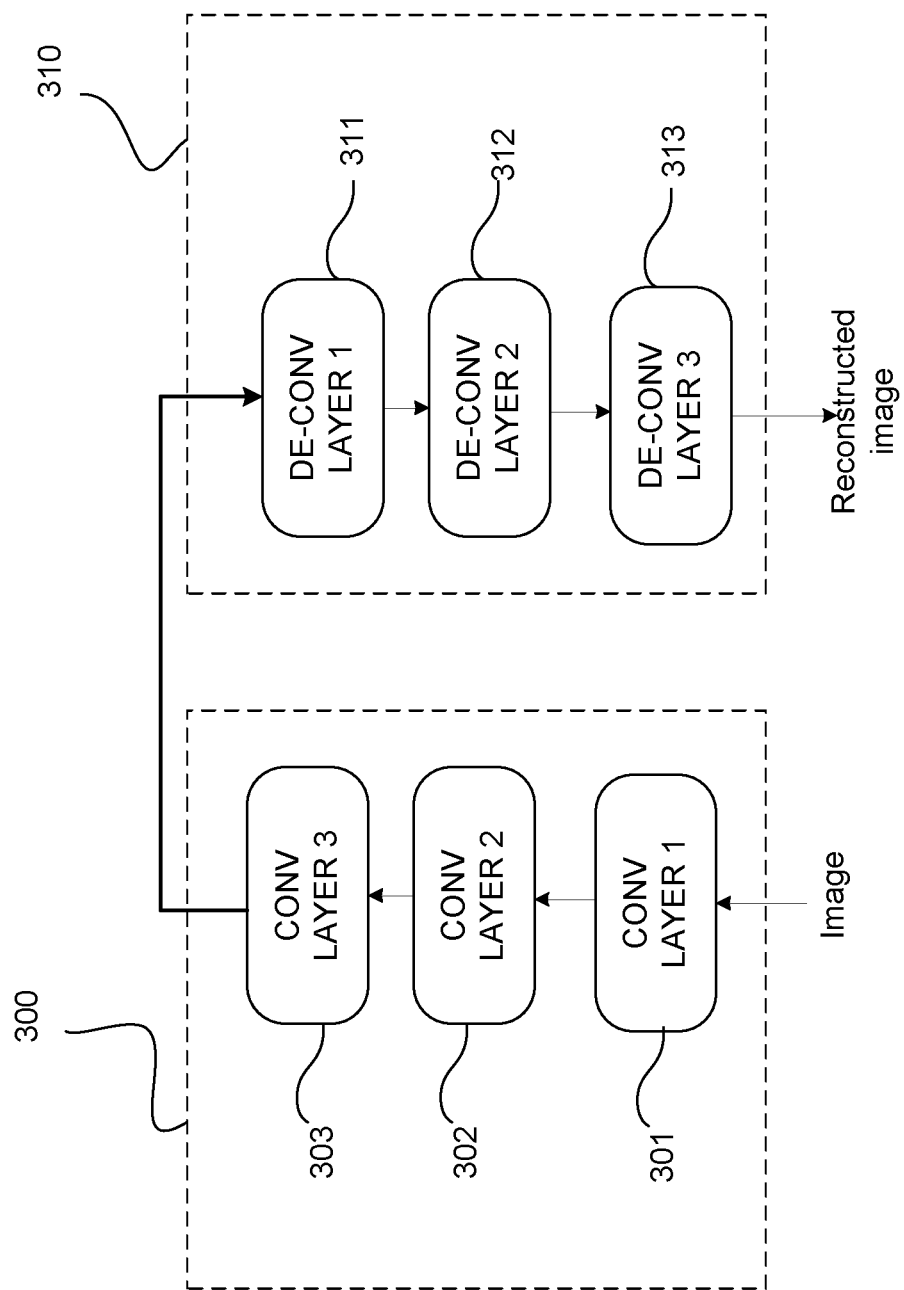
FIG. 3 shows an encoder-decoder system implemented as a convolutional and a de-convolutional network.

The structure of the encoder and the decoder of the neural encoder-decoder model can be any type but, for visual analysis, one of the most common structures is a convolutional network (CNN) for the encoder and de-convolutional network (de-CNN) for the decoder. The de-CNN is a network with layers performing transposed convolution. FIG. 3 illustrates an example of encoder-decoder model. The neural network of FIG. 3 comprises an encoder 300 and a decoder 310. The encoder 300 is implemented as a convolutional network (301, 302, 303) and the decoder 310 is implemented as a de-convolutional network (311, 312, 313). As is realized from FIG. 3, the decoder 310 receives feature maps from the last layer 303 of the encoder 300, and reconstructs the image with the de-convolutional layers (311, 312, 313). In this kind of system, the decoder 310 needs to reconstruct data only from small, low-dimensional vector (the output of the encoder's last layer).

Figure 4:
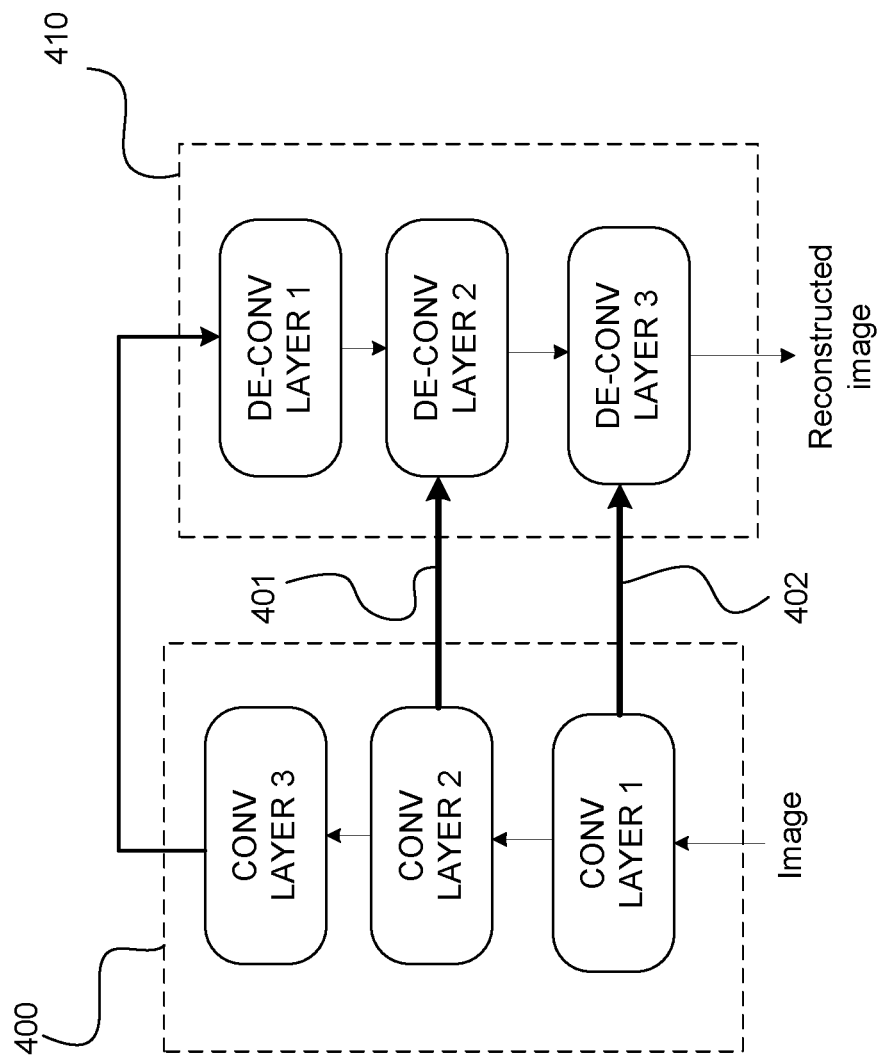
FIG. 4 shows an encoder-decoder system with lateral connections.

Furthermore, this vector encodes only semantically high-level information, such as shapes, objects, etc. The intermediate and lower layer's information is not directly used for reconstruction. In a Ladder network, shown in FIG. 4, lateral connections 401, 402 are added between an encoder 400 and a decoder 410 in order to help the decoder 410 to get more information from intermediate layers (Cony layer 1, Cony layer 2). These lateral connections 401, 402 may drastically improve denoising performance.

The encoder-decoder structure can be extended from static images to video by adding modules which model the temporal aspect of videos (e.g., movements of objects). Analysis of video or other types of data with temporal evolution (e.g., video, speech, audio, text), may be based on Recurrent Neural Networks (RNN), where a hidden representation (hidden state h) is updated based not only on the current input but also on the hidden representations obtained from past inputs. In other words, RNNs work by recursively looking at the input at each time-step t and building an internal representation of the whole sequence seen so far. This internal representation is a "summary" and can be thought of as a "memory". Currently, the most advanced and effective types of RNN are the Long Short-Time Memory (LSTM) and Convolutional Long Short-Time Memory (Conv-LSTM). RNNs may be used for many applications, such as for accumulating a summary of video frames for performing video classification, activity classification, etc. In some cases, RNNs may be used for predicting future video frames. However, RNNs may also be used alone, or in combination with CNN.

In Video Ladder Networks, recurrent connections have been applied at each block level between the encoder part and the decoder part. As a result, the neural network can model the temporal information from not only high level features but also low level features.

Feedforward connections may be also utilized to make the prediction task easier. Satisfactory results on Video Prediction may be achieved by using a neural network where the decoder is allowed to use direct information about all encoder's convolution layers for the latest past frame, which is the one which should influence the future prediction the most, especially at intermediate and lower levels. This may be implemented by adding direct lateral connections to the system in addition to the recurrent lateral connections. A direct connection may refer to a connection that delivers the feature maps of the last timestamp from the encoder part to the decoder part.

In general, neural networks can be categorized into two types: discriminative and generative. Classifiers and regressors are discriminative networks. Networks generating new data (such as images) are generative networks. Discriminative networks may be trained by supervised methods, whereas generative networks may be trained by unsupervised or self-supervised methods. Reinforcement learning methods may be used when the objective function is not differentiable.

The "generative models" (i.e., generators) are trained to generate samples that resemble the training data samples. They can be considered to model the probability distribution of the data either explicitly or implicitly. The training dataset, which is a subset of all possible data, expresses the empirical distribution (an approximation of the actual data distribution). The generator may be trained by using a modified version of the adversarial training algorithm (generally known as Generative Adversarial Network GAN), where an auxiliary network is used at training stage for providing the loss gradient used for training the generator G. In classical GAN, the auxiliary network is referred to as discriminator D.

Generative models, such as GANs (Generative Adversarial Networks) have three main goals, which define their generative power of expressiveness.

The first goal is realistic visual quality, or consistent data samples. The model needs to generate consistent and realistic images, videos or other types of content. Each component (e.g. pixel) in the generated content is likely to be dependent of other generated components, and the whole sample needs to have similar consistency as real data samples. For instance, in the case of face images, both sides of the face need to be similar, but mirrored.

The second goal is diversity, or mode-coverage. Diversity means generating content with the same variability as the training data is, i.e. content from different modes of the data distribution. Example for a generative model of faces: models may correspond to gender, age, skin color, sunglasses, eyeglasses, smiling and other expressions, hairstyle, etc. The biggest issue of GANs is the mode collapse: the generator G finds one or few modes which easily fool the discriminator D, and keeps specializing in generating only from those modes. As a result, the trained model is only able to generate convincing samples from one or few modes, for example images of all female and smiling faces.

The third goal is generalization or learning the semantics. The model needs to generate realistic samples, but not memorize the training set (overfitting). In fact, just checking that the model generates realistic images is not a sufficient sign of successful learning. A simple look-up table may just memorize samples from the training set and output one of those. A generative model needs to generate novel samples. This is needed for semi-supervised learning, generating unseen data samples, or generating conditional data with conditions not found in the training set (e.g. inpainting).

As mentioned, when a machine learning system is developed, one of the main tasks is to compare a model to other models in order to understand which one performs better, for example: which model family is better (for example GAN, Variational Auto-Encoder, PixelCNN, etc. in the case of generative models); which hyper-parameters are better for training a certain model family (e.g. number of layers, number of neurons per layer, etc.)

In the case of generative models, human evaluation of mode coverage may require at least 20 people to watch and visually evaluate hundreds of generated images, and this has to be repeated for each single trained model (from the set of hundreds or thousands of models). Apart from the time-consuming and costly aspect, visually inspecting mode coverage is very challenging for humans, especially when all modes need to be checked.

With respect to automatic evaluation methods, the related technology knows an Inception Score that measures how certain a model is in classifying the input image, by checking how peaked the predicted probability distribution classes is per example, and additionally how well the model covers the classes overall. Another, very recent, known method is the Fréchet Inception Distance, where activations from a more expressive layer (than the output layer) of the Inception net are used as a means for evaluation. The present solution provides an improved automatic evaluation for generative models, with special focus on the mode-coverage (diversity) aspect, which is currently the most challenging aspect to measure reliably.

The present solution comprises leveraging the information about modes "encoded" into activations of multiple intermediate feature maps extracted by a pre-trained neural network C in order to evaluate samples from a generative model G. For example, the pre-trained net C can be a classification network such as an Inception model. When a generative model G is evaluated, samples from a perfect generative model are expected to create similar activations in model C as real data would. The present solution may be also utilized to compare multiple models $G_1 \ldots G_N$, and rank them automatically based on the different values of this score.

In an additional embodiment of the solution, information on modes encoded into activations from multiple layers of an auto-encoder is leveraged.

In a yet additional embodiment of the solution, the proposed diversity-evaluation score is used for evaluating the generalization capabilities of the model.

In a yet additional embodiment, a score is used for evaluating the semantic stability for conditional models, i.e., for measuring how consistent the model is in generating data based on other (contextual) data.

In a yet additional embodiment, the evaluation scores are used as an evaluation metric for measuring the general generative power of a generative model.

The solution and the additional embodiments are discussed in more detailed manner next.

As discussed above, the present solution addresses the problem of evaluating generative machine learning models. In particular, the solution proposes a set of evaluation metrics which measure the diversity (or mode coverage) of generated samples, the generalization abilities of the model, and the semantic consistency (or stability) for the special case of conditional models.

It is appreciated that the proposed metrics can be applied to any generative model family, such as Generative Adversarial Networks (GANs), Variational Auto-Encoders (VAEs), PixelCNN, etc. The main requirement for the model family is that the samples to be evaluated and being generated by the generative model, and held-out samples from the real data distribution (i.e., real samples) are available.

In the present embodiments a parameter called Supervised Omni-Score (SOS) is provided for evaluating the diversity (or mode coverage) of trained generative models. In SOS, the information about modes encoded into activations of multiple intermediate feature maps extracted by a pre-trained neural network is leveraged. The term "supervised" should not be interpreted to relate to actual computation of the score, but to the way the pre-trained neural network has been trained. For example, the pre-trained neural network can be a classification model, such as an Inception network. In fact, such classification networks are usually trained in a supervised fashion.

The present solution is based on expectation that samples generated from two distributions with very different mode coverage would produce very different activations from multiple intermediate layers. Conversely, samples from a perfect generative model (i.e., one which has captured the data distribution perfectly, including all modes), would produce similar activations as for samples from the real data distribution.

Figure 5:
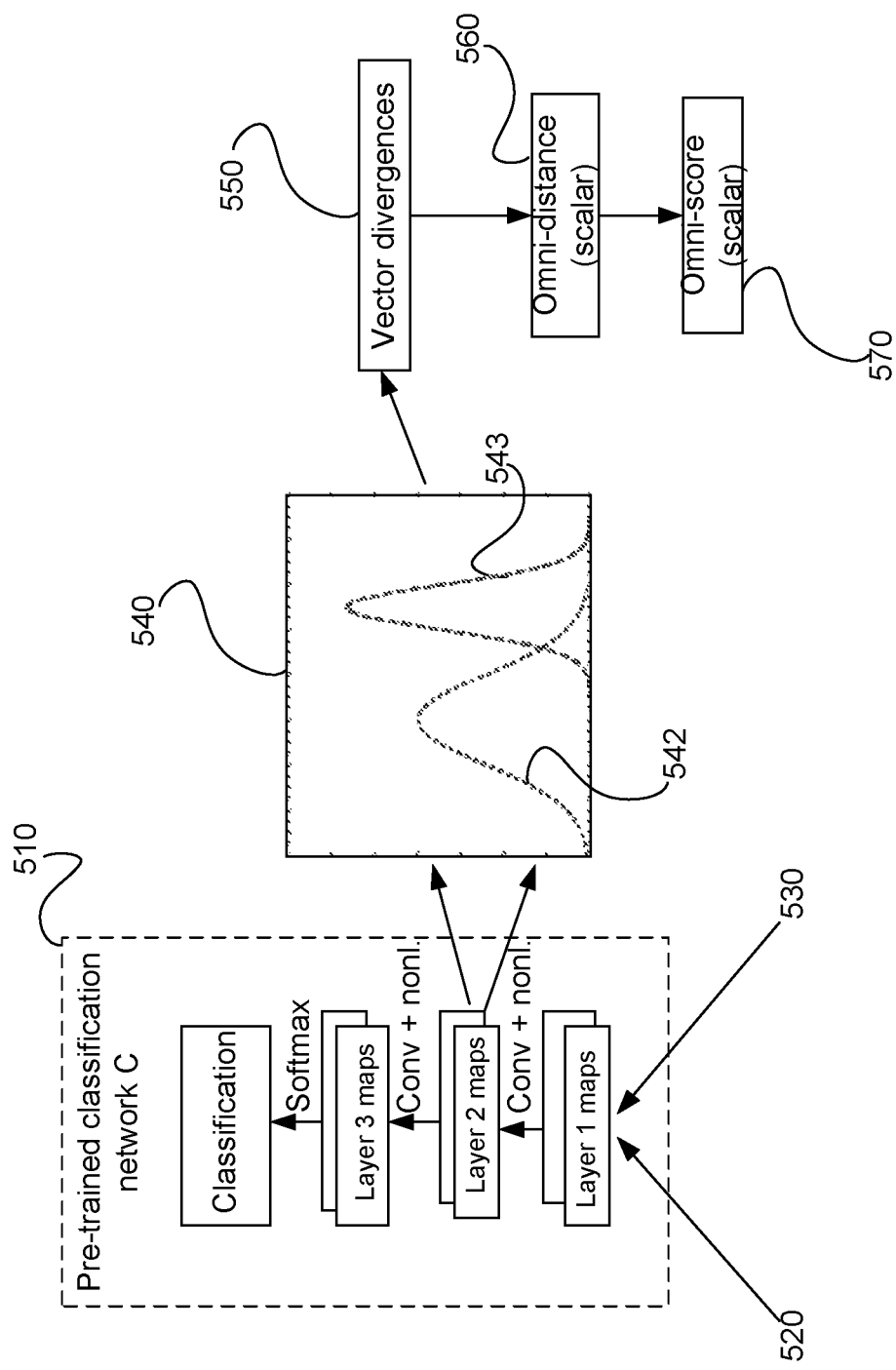
FIG. 5 shows an overview of a solution according to an embodiment.

The SOS is explained with reference to FIG. 5 showing an overview of a system according to an embodiment, where for each feature map (which represents a certain semantic concept, and can be related to a mode of the data distribution), statistics over all (or a batch of) generated images and over all real images are computed.

In FIG. 5, a pre-trained classification neural network 510 is used for extracting feature maps from multiple layers. This is done separately for real samples 520 and for generated samples from a generative model G 530. For each feature map of pre-trained classification network 510, statistics over all samples are computed, separately for generated samples 542 and real samples 543. These two statistics (for each feature map) are then compared by using a distance function. For example, the statistics may be the feature map mean and variance, and the distance may be symmetric KL divergence assuming Gaussian distributions. For each feature map, a distance of distributions, e.g., symmetric KL divergence assuming normal distributed data is computed.

Once a distance for each feature map has been obtained, a vector of distances (i.e. divergences) 550 is generated. The vector is simply made of all distances computed from all feature maps, i.e., each vector bin contains the distance between a feature map from a certain layer when analyzing real data and a feature map from the same layer when analyzing generated data. The vector of distances has a size equal to the number of considered feature maps. The final Omni-Distance 560 is obtained by averaging the various distances of the vector of distances. This means that all feature maps are treated equally. However, if the ranges of values in the feature maps from different layers are very different among them (e.g., the range of feature layer 1 is much wider than for feature layer 5), it may be beneficial to perform a suitable normalization in order to transform the activations at different layers to similar ranges. For example, z-score normalization may be used. One thing to note is that, if methods such as the method known as Layer Normalization is used as a component of the neural network, there may be no need to adjust the ranges of activations.

The Supervised Omni-Score 570 is defined to be the inverse of Omni-distance 560.

It is appreciated that any number of distribution moments can be used and any other distance metric between distributions can be used instead of KL divergence over Gaussian distributions. In addition, it is possible to compute, and use a distance, covariances and cross-correlations between activations in different feature maps and/or spatial and temporal locations.

For example, the following statistical distances may be used alternatively to the KL distance: Other f-divergences than KL, e.g., Hellinger distance, Total Variation distance; Fréchet distance (Wasserstein-2 distance); Kolmogorov-Smirnov (for instances, the two sample K-S test, which is a distance between the empirical distribution functions of two samples without any assumptions about the underlying distributions); Approximations of the Earth Mover distance; Other statistical test and metrics, such as Cramér-von Mises, Kuiper, Shapiro-Wilk test, Anderson-Darling test, Rényi's divergence, Jensen-Shannon divergence, Lévy-Prokhorov metric, Bhattacharyya distances, or the Maximum Mean Discrepancy.

For videos or other temporal data the models C and G may include RNN or LSTM cells, and the distance can be computed by computing the activations of model C over all the time steps.

As an additional embodiment, it is possible to have more fine-grained metric that takes into account differences of activations in the spatial domain. This may be done by averaging the feature maps of model C at each spatial location (at any wanted resolution) instead of the averaging over the whole feature map. (Similarly for temporal points for temporal data)

Similarly, one can divide to score to multiple components, e.g. one component per layer of model C, and thus get a more detailed understanding of the model's performance at difference semantic levels.

Figure 6:
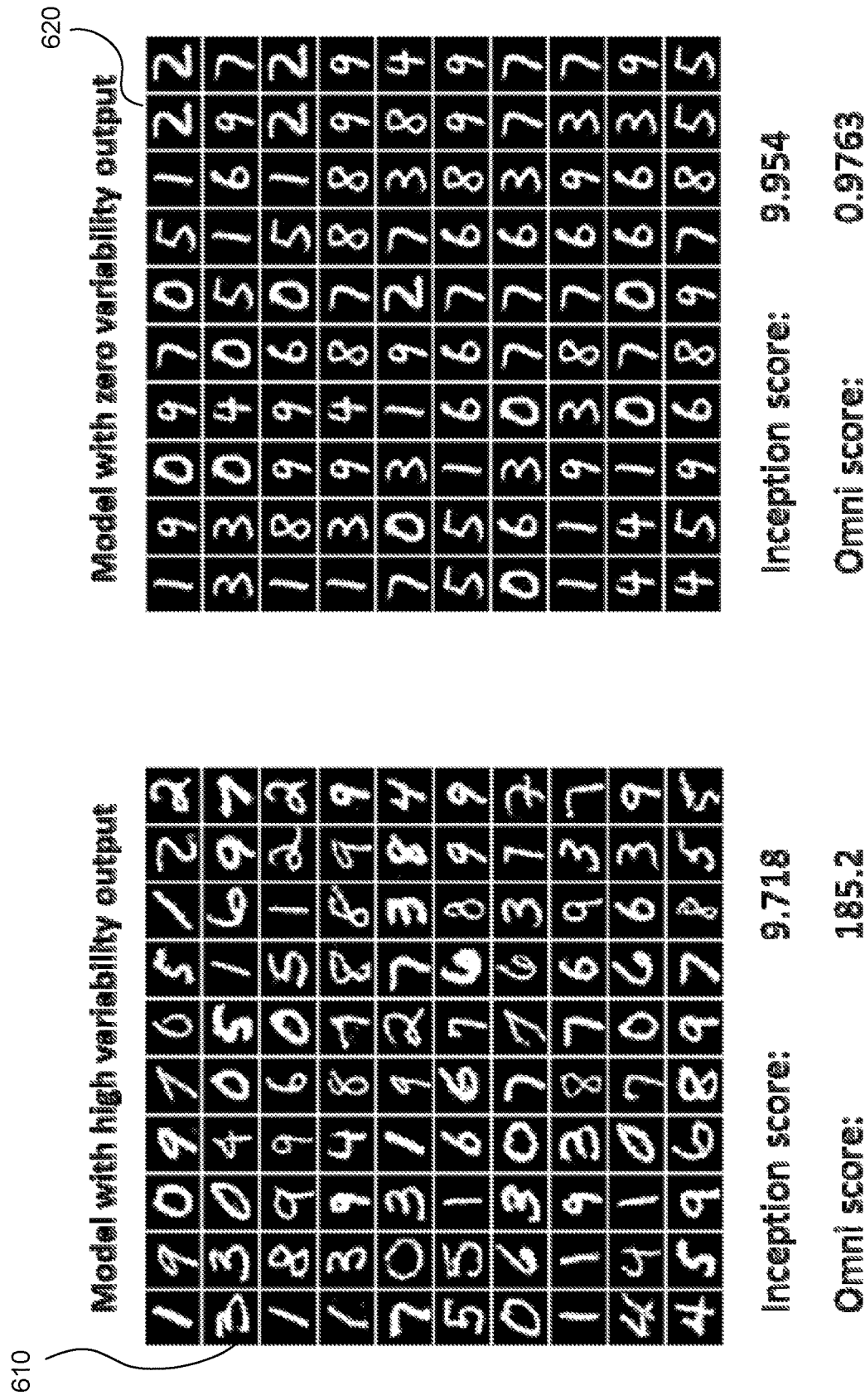
FIG. 6 illustrates a comparison of an Inception Score and a Supervised Omni-Score for evaluating images generated by two different generative models.

FIG. 6 illustrates samples from two model configurations. The images on the left side 610 have been generated by a model configuration with better diversity (i.e., a model whose generated same-digit samples look different), whereas the images on the right side 620 have been generated by a model configuration with worse diversity (same-digit samples look same). The Inception score does not work well in detecting bad mode coverage of the model in the right. The Inception score gives even higher score to the worse model. Instead, the proposed Omni-Score provides very different values, where the value for the better model is much higher than for the worse model. It should be noticed that the Omni-Score (higher score is better) is the inverse of Omni-distance (smaller distance is better). These scores have been shown to behave with similar consistency over various models.

Figure 7:
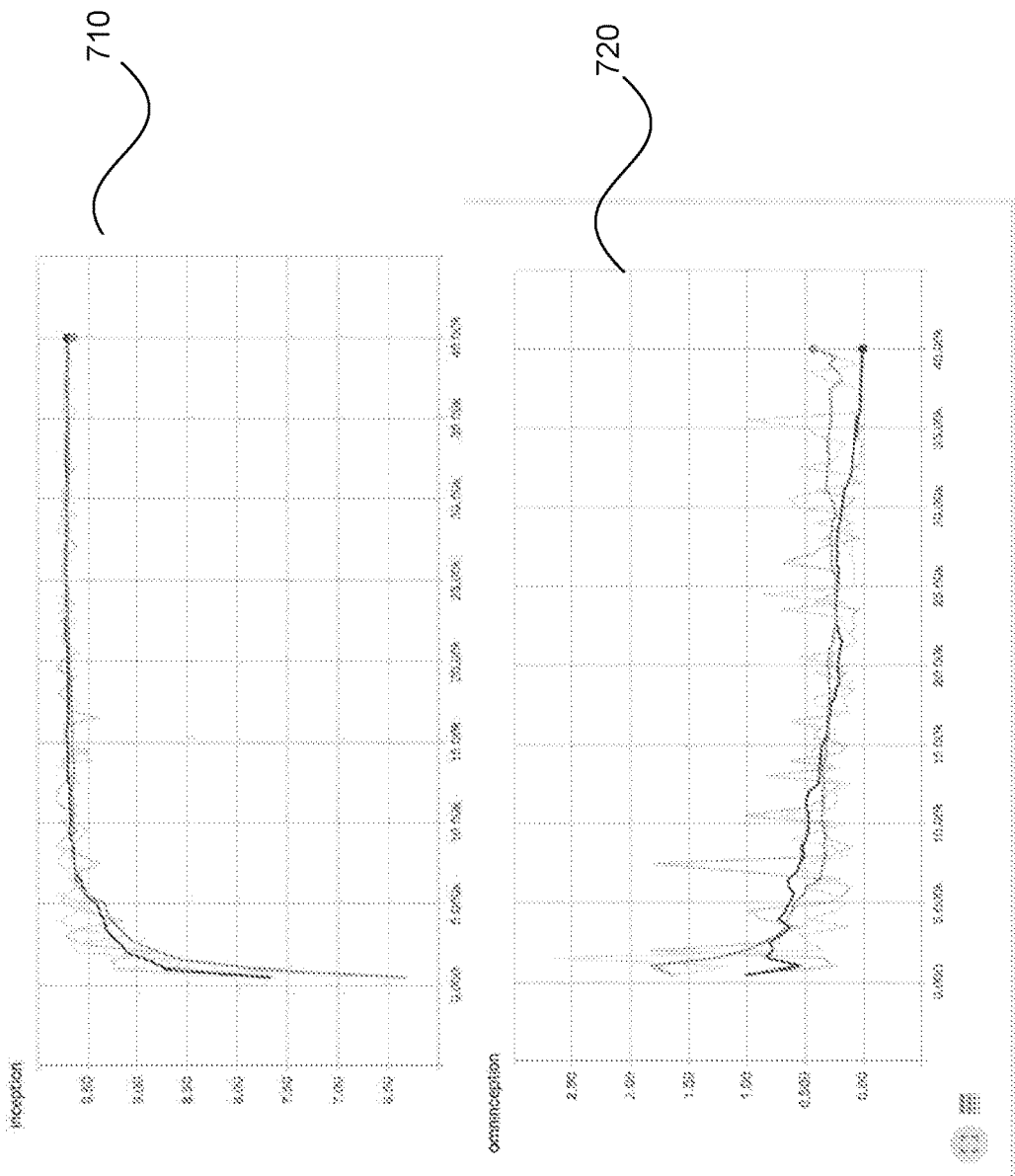
FIG. 7 illustrates an example of training of two models with same hyperparameters.

As a result of experiments, it has been observed that Inception Score is quickly maximized during training, but Supervised Omni-Score (SOS) keeps improving and it gives much better insight on models performance during training. FIG. 7 illustrates the training of two modes (Inception 710 and Omninception 720, i.e. omni-distance) with same hyperparameters, but a different random seed. Both models get good Inception Score early on, but the SOS keeps improving to the end and shows differences between the two modes while they are training.

As an additional embodiment, the score may be broken down layer by layer, by considering the distances obtained for each feature map, before averaging them. This may allow for inspecting the different aspects of mode coverage and overfitting.

Another possibility is that the pre-trained neural network belongs to the family of auto-encoders, such as de-noising auto-encoders. Auto-encoders are usually trained in unsupervised manner (or self-supervised manner), where the input data (before being corrupted by noise) represents the target or ground truth data to be predicted. The score would be computed in a similar way as for the Supervised Omni-Score but by using the activations extracted either by the encoder path, or by the decoder path, or by both encoder and decoder paths. In this case, we refer to the score as the Unsupervised Omni-Score (UOS). This allows us to use the omni-score with unlabeled datasets, and with datasets, whose labels are not related to the task at hand.

It is also possible to use a Ladder-style pre-trained model to compute the Omni-Score. Ladder networks are trained in a semi-supervised manner. One path of the network (the classification path) is used for supervised training, and one path (the auto-encoder path) is used for unsupervised training.

Conditional generative models are models which generate data (e.g., image content) based on some other data. For example, image inpainting consists of letting a neural network inpaint (by imagination) a certain missing region of an image. In this disclosure, a "semantic space" is referred to as an embedded space (i.e., a transformed space, obtained by a transformation from the pixel space) where nearby points represent similar semantic concepts. E.g., nearby points may represent images of cats and dogs, whereas far away points may represent images of cats and cars.

One desired feature for conditional generative models is to have "semantic stability", i.e., to imagine content which can be diversified (i.e., covering many modes of the data distribution) but which cannot jump from one semantic region to a very far away semantic region (in a semantic space). This is needed so that, when a generative model is run multiple times, it would not inpaint too different concepts. So, the network is required not only to inpaint semantically meaningful concepts (based on the context), but also to inpaint consistently in multiple runs. One practical advantage of this is video inpainting, where multiple frames need to have semantic consistency.

As an example: the network is conditioned of an image of a forest, where a region of a tree is missing. If the model is desired to inpaint concepts from a forest (so that the final image would be classified still as "forest" for example by the Inception Score of related art) but also it is desired that in multiple runs the model does not jump from a first concept, e.g. clouds or mountain, to another concept, e.g. monkey or bird. In order to evaluate the semantic stability, the input random vector (that is usually added to the region to be inpainted within the image on which the generator is conditioned) can be varied (for example by re-sampling part of the vector, from a noise distribution such as Bernoulli distribution) and it can be observed how much the inpainted output changes in semantic space. This may be done automatically by measuring the distance of the two inpainted images (before and after the change in the input random vector) after they have been embedded into the semantic space by using an embedding neural network. If small changes in the input random vector make only small changes in the Scores, then a high Semantic Stability Score (SSS) can be assigned, otherwise, if the changes are abrupt (big jumps in the semantic space), the Semantic Stability Score will be low.

One concrete example of the SSS measure is the inverse of the average gradient of the output of the classification network with regards to the input random vector. For example, if the gradient is high, it means that even a small change in the input random vector will have a high change in the semantic concept, thus the SSS value will be low.

It is also possible to evaluate the amount of overfitting using the proposed score. For this, the comparison score (e.g., SOS, SSS or UOS) is computed for both training and test data. The inverse of the difference between these computed scores represents the amount of various aspects of overfitting to the training data. By considering the SOS score type, one SOS value may be computed for training data and another SOS value may be computed for the test data. The different between these two values would provide information about overfitting. For example, if the difference is small, it would mean that the model is not overfitting. Whereas, if the difference is big (with higher score for training data and lower score for test data), it would mean that the model is overfitting and thus not performing well on the test data. In this overfitting case, it means that the model is able to generate data with good mode diversity with respect to the modes present in the training data, but is not able to generate data with good mode diversity with respect to the modes present in the test data. Similar procedure may be followed for the other score types, namely SSS and UOS.

The final Omni-Score may comprise the following terms:
a) The original (Supervised) Omni-Score obtained from a pre-trained supervised model (e.g., a classification model);
b) The Unsupervised Omni-Score obtained from a pre-trained auto-encoder model; c) The Generalization Omni-Score.

The final Omni-Score may then be utilized together with the Inception Score, and with the proposed Semantic Stability Score. The Omni-Score can measure the mode-coverage, the Inception Score can measure the realistic visual quality, and the Semantic Stability Score may measure how stable a conditional generative model would behave in multiple runs.

In above, embodiments of a present solution have been discussed. In the embodiments, divergence and mode coverage are measured by using activations from multiple (for example, all) layers of a pre-trained neural network. The present solution provides different metrics for evaluating the generative model, but also a semantic stability score that allows to compute metrics for the stability of e.g. conditioned models.

Figure 8:
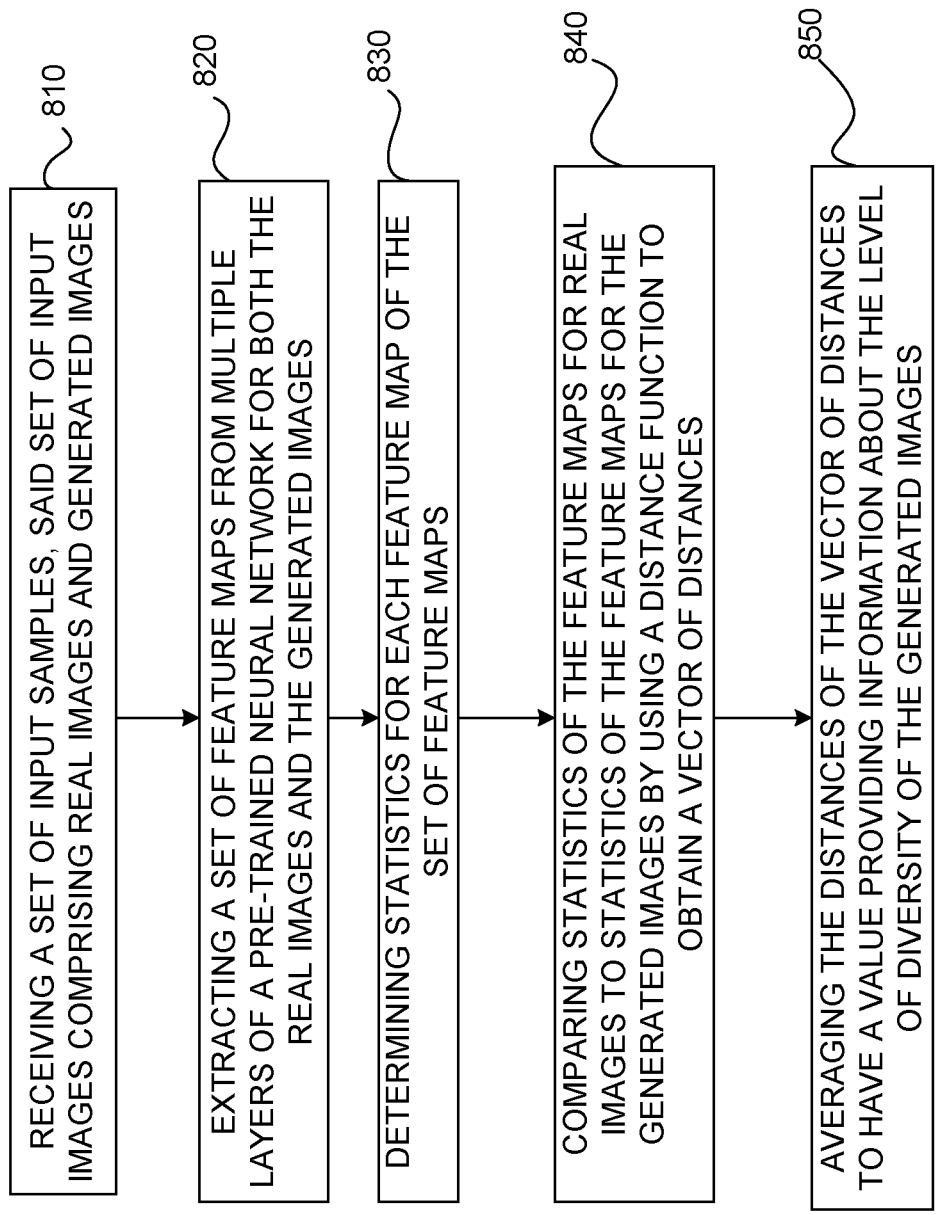
FIG. 8 is a flowchart illustrating a method according to an embodiment.

FIG. 8 is a flowchart illustrating a method according to an embodiment. A method comprises receiving a set of input samples, said set of input images comprising real images and generated images 810; extracting a set of feature maps from multiple layers of a pre-trained neural network for both the real images and the generated images 820; determining statistics for each feature map of the set of feature maps 830; comparing statistics of the feature maps for real images to statistics of the feature maps for the generated images by using a distance function to obtain a vector of distances 840; and averaging the distances of the vector of distances to have a value providing information about the level of a diversity of the generated images 850.

An apparatus according to an embodiment comprises means for receiving a set of input samples, said set of input images comprising real images and generated images; means for extracting a set of feature maps from multiple layers of a pre-trained neural network for both the real images and the generated images; means for determining statistics for each feature map of the set of feature maps; means for comparing statistics of the feature maps for real images to statistics of the feature maps for the generated images by using a distance function to obtain a vector of distances; and means for averaging the distances of the vector of distances to have a value providing information about the level of diversity of the generated images. The means comprises a processor, a memory, and a computer program code residing in the memory.

The various embodiments may provide advantages. For example, the mode coverage and the divergence are measured from all layers. The proposed score is computationally quite inexpensive, so it can be computed also during training of the models in order to monitor the training progress. Since the score is computed as a difference between generated and real data, it is possible to also measure overfitting of various aspects of the models by comparing the scores generated both from training and test data. This is not possible with Inception Score, for instance.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
receiving a set of input samples, said set of input samples comprising real images and generated images;
extracting a set of feature maps from multiple layers of a pre-trained neural network for both the real images and the generated images;
determining respective statistics for feature maps of the set of feature maps;
comparing respective statistics of the feature maps for the real images with corresponding respective statistics of the feature maps for the generated images, wherein the comparing of the statistics comprises using a distance function to obtain a vector of distances; and
averaging distances of the vector of distances to have a value providing information about a level of diversity of the generated images.

2. The method according to claim 1, wherein the pre-trained neural network is one of an autoencoder or a ladder autoencoder trained via unsupervised or semi-supervised training.

3. The method according to claim 1, wherein the statistics are determined per spatial or temporal location in addition to determining them per feature map.

4. The method according to claim 1, wherein the statistics comprises one or more of the following: a feature map mean, a variance, covariance, cross-correlation between the feature maps or spatial and/or temporal locations.

5. The method according to claim 1, wherein the averaging of the distances of the vector of distances produces a final distance, wherein an inverse of the final distance is the value for providing information about the level of diversity of the generated images.

6. The method according to claim 1, further comprising:
determining a value indicating semantic stability of the generated images, wherein the determining of the value indicating semantic stability comprises inputting a random vector to the pre-trained neural network; and
varying the input random vector to determine a change in a semantic space.

7. An apparatus comprising at least one processor, non-transitory memory including computer program code, the memory and the computer program code configured to, with the at least one processor, cause the apparatus to perform at least the following:
receive a set of input samples, said set of input samples comprising real images and generated images;
extract a set of feature maps from multiple layers of a pre-trained neural network for both the real images and the generated images;
determine respective statistics for feature maps of the set of feature maps;
compare respective statistics of the feature maps for the real images with corresponding respective statistics of the feature maps for the generated images, wherein the comparing of the statistics comprises using a distance function to obtain a vector of distances; and
average distances of the vector of distances to have a value providing information about a level of diversity of the generated images.

8. The apparatus according to claim 7, wherein the pre-trained neural network is one of an autoencoder or a ladder autoencoder trained via unsupervised or semi-supervised training.

9. The apparatus according to claim 7, wherein the statistics are determined per spatial or temporal location in addition to determining them per feature map.

10. The apparatus according to claim 7, wherein the statistics comprises one or more of the following: a feature map mean, a variance, covariance, cross-correlation between the feature maps or spatial and/or temporal locations.

11. The apparatus according to claim 7, further comprising computer program code configured to cause the apparatus to produce a final distance, wherein an inverse of the final distance is the value for providing the information about the level of diversity of the generated images.

12. The apparatus according to claim 7, further comprising computer program code configured to cause the apparatus to determine a value indicating semantic stability of the generated images, wherein the determining of the value indicating semantic stability comprises inputting a random vector to the pre-trained neural network and varying the input random vector to determine a change in a semantic space.

13. A computer program product embodied on a non-transitory computer readable medium, comprising computer program code configured to, when executed on at least one processor, cause an apparatus or a system to:

receive a set of input samples, said set of input samples comprising real images and generated images;

extract a set of feature maps from multiple layers of a pre-trained neural network for both the real images and the generated images;

determine respective statistics for feature maps of the set of feature maps;

compare respective statistics of the feature maps for the real images with corresponding respective statistics of the feature maps for the generated images, wherein the comparing of the statistics comprises using a distance function to obtain a vector of distances; and average distances of the vector of distances to have a value providing information about a level of diversity of the generated images.

14. An apparatus comprising at least:

circuitry configured to receive a set of input samples, said set of input samples comprising real images and generated images;

circuitry configured to extract a set of feature maps from multiple layers of a pre-trained neural network for both the real images and the generated images;

circuitry configured to determine respective statistics for feature maps of the set of feature maps;

circuitry configured to compare respective statistics of the feature maps for the real images with corresponding respective statistics of the feature maps for the generated images, wherein the comparing of the statistics comprises using a distance function to obtain a vector of distances; and circuitry configured to average distances of the vector of distances to have a value providing information about a level of diversity of the generated images.

15. The apparatus according to claim 14, wherein the pre-trained neural network is one of an autoencoder or a ladder autoencoder trained via unsupervised or semi-supervised training.

16. The apparatus according to claim 14, wherein the statistics are determined per spatial or temporal location in addition to determining them per feature map.

17. The apparatus according to claim 14, wherein the statistics comprises one or more of the following: a feature map mean, a variance, covariance, cross-correlation between the feature maps or spatial and/or temporal locations.

18. The apparatus according to claim 14, further comprising circuitry configured to produce a final distance, wherein an inverse of the final distance is the value for providing the information about the level of diversity of the generated images.

19. The apparatus according to claim 14, further comprising circuitry configured to determine a value indicating semantic stability of the generated images, wherein the determining of the value indicating semantic stability further comprises inputting a random vector to the pre-trained neural network and varying the input random vector to determine a change in a semantic space.

* * * * *